(12) United States Patent
Neve de Mevergnies

(10) Patent No.: US 6,254,906 B1
(45) Date of Patent: Jul. 3, 2001

(54) MULTILAYERED PASTA-TYPE PASTE AND METHOD FOR PRODUCING SAME

(76) Inventor: Jean Neve de Mevergnies, Rue Victor Hugo 11, Tiercelet (FR)

( * ) Notice: Subject to any disclaimer, the term of this patent is extended or adjusted under 35 U.S.C. 154(b) by 0 days.

(21) Appl. No.: 08/793,708

(22) PCT Filed: Sep. 4, 1995

(86) PCT No.: PCT/BE95/00078

§ 371 Date: Dec. 2, 1999

§ 102(e) Date: Dec. 2, 1999

(87) PCT Pub. No.: WO96/07332

PCT Pub. Date: Mar. 14, 1996

(30) Foreign Application Priority Data

Sep. 2, 1994 (BE) .................................................. 9400790

(51) Int. Cl.[7] ............................................................. A23L 1/16
(52) U.S. Cl. ........................... 426/94; 426/451; 426/452; 426/557; 426/560
(58) Field of Search .............................. 426/94, 451, 452, 426/557, 560

(56) References Cited

U.S. PATENT DOCUMENTS 4,244,974 * 1/1981 Minami et al. ....................... 426/94
4,675,199 * 6/1987 Hus ..................................... 426/557
5,114,724 * 5/1992 Bottero ............................... 426/249

FOREIGN PATENT DOCUMENTS

| 0 203 321 | 12/1986 | (EP) . |
| 1515083 | 3/1968 | (FR) . |
| 2010658A | 7/1979 | (GB) . |
| 85656 | 6/1986 | (LU) . |

OTHER PUBLICATIONS

Patent Abstracts of Japan, (vol. 005, No. 041 (C–047) ) of Japanese patent application 79–072414, abstract published Mar. 18, 1981.
Derwent Abstract 004727202 of Luxembourg patent application LU–85656, application published Jun. 4, 1986.
The Martha Stewart Cookbook. Copyright 1995 pp. 358.*
Sunset "Fresh Ways with Pasta", Copyright 1990, pp. 6.*

* cited by examiner

Primary Examiner—Nina Bhat
(74) Attorney, Agent, or Firm—Fish & Neave; Margaret A. Pierri

(57) ABSTRACT

Pasta-type paste containing ingredients (5, 7) in the form of heteroelements or occlusions, comprising a base layer (3) formed from wheat semolina and/or various cereal flours and water. The invention is characterized in that it comprises at least one additional heterogeneous layer (2, 4) consisting of a paste mixture (6) with the inclusion of ingredients (5, 7) superimposed on the essentially homogeneous base layer (3) which is free from incorporated ingredients (5, 7).

24 Claims, 2 Drawing Sheets

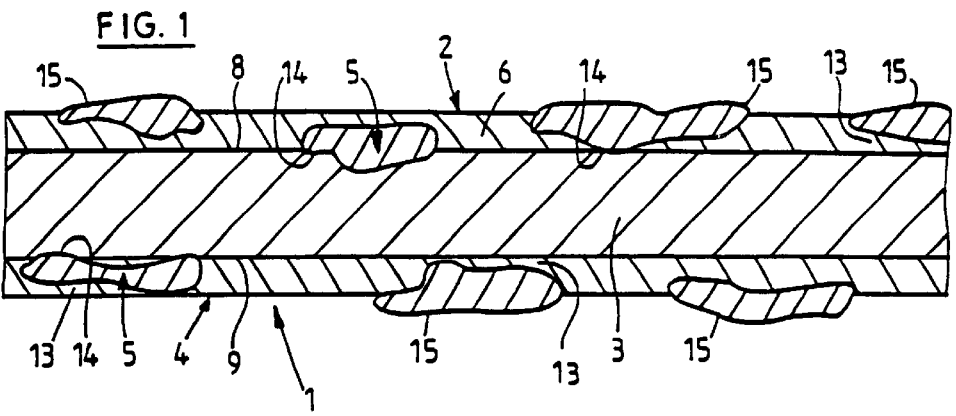
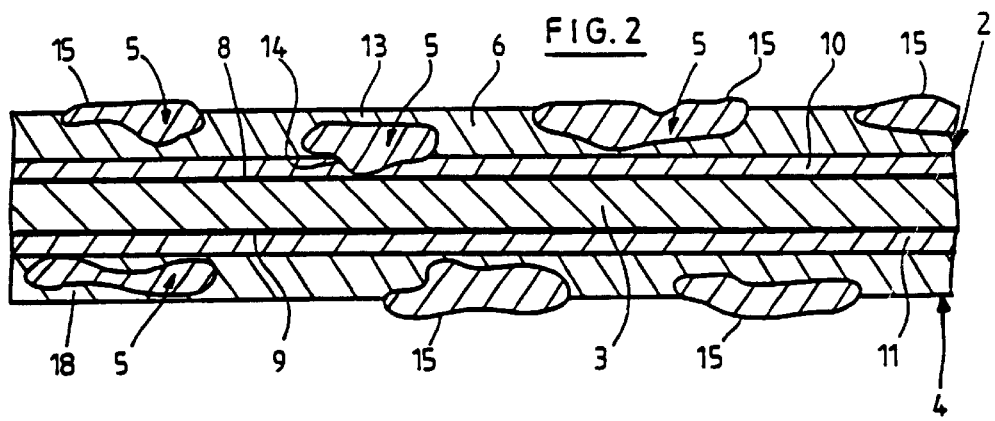
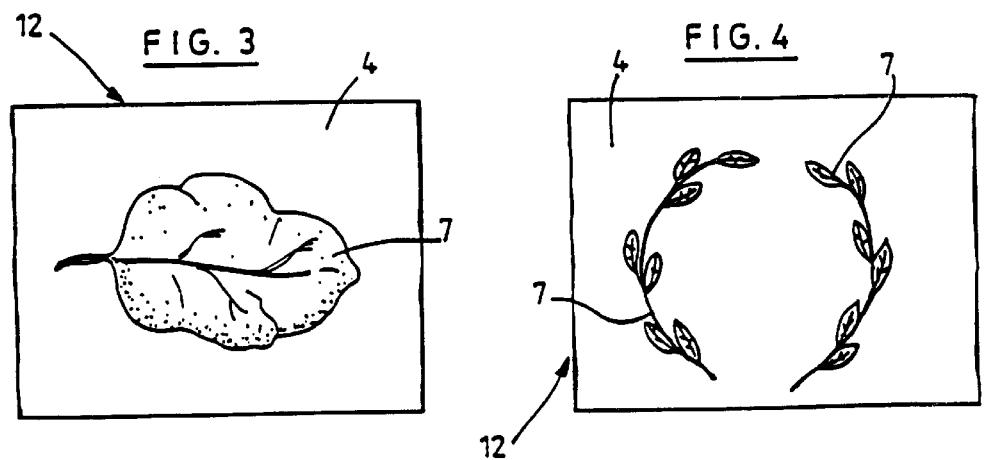

US 6,254,906 B1

MULTILAYERED PASTA-TYPE PASTE AND METHOD FOR PRODUCING SAME

CROSS-REFERENCE TO RELATED APPLICATIONS

This application claims priority under 35 U.S.C. §§ 120 and 365(c) from co-pending International Patent Application PCT/BE95/00078, filed Sep. 4, 1995, designating the United States of America and claiming priority from Belgian Patent Application 9400790, filed Sep. 2, 1994.

TECHNICAL FIELD OF THE INVENTION

The present invention relates to garment pasta containing at least one added ingredient provided for modifying their taste and comprising a base layer formed by durum wheat semolina and/or cereal flours and by water.

BACKGROUND OF THE INVENTION

There is known pasta formed from a dough made of durum or tender wheat semolina and/or cereal flours, and of water, which are subjected to a lamination, if need be to a drying process. There are also products having flat surfaces, such as the so-called "taillades" or lasagnas etc.

Pasta is often served with different kinds of sauces. For the consumer saving time, there is available on the market compartmentalized packings containing the pasta in a compartment and the ingredients required for making the sauce in at least one further compartment.

There is also pasta or alimentary pastes with incorporated different ingredients or edible additives reduced to a fine powder, such as spices or condiments, origanum or sage etc., or vegetables: tomatoes or spinach etc. In this case, said ingredients are incorporated in the mass of dough when initially making the mixture of durum wheat semolina and/or of cereal flour and water, if need be by adding eggs in order to obtain pasta with eggs.

There is also known from document LU-A-85656 alimentary pastes having on their surface pieces of additives or added ingredients. Said pieces are enclosed at least partially in a monobloc mass of dough. This type of alimentary pastes leads to a problem for the pieces of getting unset when boiling. Furthermore, the added ingredients are not uniformly allocated, which can affect unpleasingly the taste and the aspect, and also the cohesion of the pasta regions which are more "loaded" than others.

Also known are alimentary pastes with incorporated pieces or fragments of larger ingredients and with a density higher than the one of the dough and which are mixed in the mass of the dough when kneading the latter. With this known type of pasta, the rate of pieces or fragments visible on the surface of the pasta can only be relatively small if there is wished simultaneously keeping a satisfactory cohesion of the integral paste like bulk and avoiding an overload of ingredients which may cause an unpleasant taste.

The aim of the invention is to remedy said drawbacks. To this end, the pasta according to the invention comprise at least one additional layer formed by a mixture of dough and added ingredients superimposed on the base layer.

SUMMARY OF THE INVENTION

The invention thus provides pasta containing added ingredients such as condiments or spices which are directly incorporated into the pasta, so as to be yet spiced, and yet ensuring a holding of each additional layer on the dough sheet forming the base layer by the presence of a pastelike ball film which sets the pieces on the surface of the dough sheet. Hooking the hard pieces of the pastelike ball is thus obtained thanks to the fixing action of the latter by setting the additional layers forming a film rather than by possibly pressing said pieces in the surface of the dough. The base layer can thus be kept perfectly homogeneous without any extraneous body with a perfect internal cohesion, and the adherence of the added pieces, which can have a density considerably higher than the one of the pasta, is assured by the additional layers forming a retention film which provides a perfect setting up of said pieces with respect to the base layer.

With the type of alimentary paste which is known from said document LU-A-85656, the base layer itself contains already in its mass added ingredients, such as pieces and additives. In contrast, the added ingredients in the present invention are provided on the surface of the base layer, which is homogeneous and free of added ingredients, by means of a respective additional layer. That additional layer provides at the same time the adherence and the visibility of the added ingredients.

Another advantage of alimentary pastes according to the invention still lies in the fact that the added ingredients remain fixed on the surface of the dough sheet even during and after boiling, by the presence of the additional layers forming a retaining film for the pieces. which extends the diffusion duration of the aroma of added ingredients and maintains the aesthetic effect owing to the specific arrangement.

Finally, the invention enables to provide the aimed effect of a relatively important distribution on the surface of the added ingredients while still keeping the ratio of added ingredients at a very reasonable level, thus allowing to avoid a feeling of disgustment owing to an overload of added ingredients. The presence of the perfectly homogeneous base layer being free of added ingredients forming the hetero-elements provides a certain cohesion to the whole.

When the pasty component of said additional layer is formed by the same materials as said base layer, an even better mutual adherence between the base layer and the additional layer(s) is obtained., more particularly when boiling. The behaviour of the different layers is the same and consequently they are maintained together even after boiling. In this respect, the material ratios have preferably the same level for said pasty component of each additional layer and for said base layer.

A good adherence of the or each additional layer itself is assured, while still keeping a sufficiently significant ratio of the added ingredients for preserving said particular effects, when said additional layer is composed from 40% to 60% by weight, preferably approximately 50% by weight, of said dough, and respectively from 60% to 40% by weight, preferably approximately 50% by weight of the added ingredients.

A visual perception of the most added ingredient(s) may be obtained by selecting for each additional layer a thickness which is substantially equal to the average thickness of said added ingredient(s).

Furthermore, each one of these additional layers forms a setting film for said added ingredients with respect to said base layer.

In particular, at least one of said additional layers contains added ingredients in the form of pieces or fragments allocated substantially uniformly in each additional layer.

In addition, by mixing, the added ingredients are allocated substantially uniformly into said additional layer which provides a pleasant and homogeneous taste effect, without being locally overloaded with seasonings or spices. In addition, the absence of local overload and the homogeneous distribution turn out to be favourable for the adherence and the cohesion of said additional layer.

The uniform distribution of added ingredients thus provides also an aesthetic effect due to the fact that at least the bigger part of said added ingredient(s) is made visible on the surface of the alimentary pastes, which can make them more attractive. By working on the size, the density, the nature and the shape of the added ingredients, a very broad range of alimentary pastes can thus easily be obtained.

Besides, according to the desired aesthetic effect, one of said additional layers comprises at least one added Ingredient in the form of an extended entire piece such as a vegetable branch or leaf, or at least one of said additional layers contains fragments of added ingredients which are allocated substantially uniformy on each additional layer, or even both of the embodiments mentioned above in combination. More particularly, each additional layer has a lower thickness, preferably considerably lower than the thickness of the base layer. Furthermore, the base layer and/or at least one of said additional layers contain ingredients in the form of fine particles so as to provide a colour to each layer containing the latter.

According to a still more particular embodiment, at least one intermediate layer is comprised between the base layer and each additional layer. A bouquet of aromas can thus be obtained which is able to provide a very fine taste by the superimposition of layers having each one's own aroma, whereby said aromas mix together only when eating the pasta.

According to a specific embodiment of the invention, each said additional layer forms, a film layer on one of the respective surfaces of the base layer, thereby setting the largest part of the one or more added ingredients the base layer enclosing virtually completely the latter.

By enclosing the substances or heterogeneous elements composing the added ingredients, a perfect adherence of the latter is obtained, particularly during and after boiling the pasta.

The present invention relates also to a process for producing above mentioned alimentary pastes.

According to a basic embodiment of the process, a mixture of the material composing the dough of each additional layer and of the one or more added ingredients is carried out, so as to obtain a substantially uniform distribution of said added ingredients in the additional layers, each additional layer containing hetero-ingredients is applied on the base layer which is free of hereto-ingredients and the multilayer structure thus obtained is subjected to a lamination so as to provide an adherence between said layers which resist to boiling.

More specifically, some moisture (steam or water) is added to said mixture depending on the relative quantity of added ingredients, so as to provide a sufficiently supple binding compound for the additional layer so that the cohesion of the latter is ensured.

When using the entire added piece, said mixture is carried out by smooth agitation so as to preserve the integrity of said entire added piece.

Preferably, the layers are laminated several times successively so as to produce pasta with the desired final thickness stepwise and progressively. Loss of production owing to structural ruptures is thereby avoided.

Further advantages and specific features of the invention will emerge from the description of some exemplary embodiments of the invention given hereinafter and illustrated with the aid of the appended drawings.

BRIEF DESCRIPTION OF THE DRAWINGS

FIGS. 1 and 2 each illustrate a cross-sectional view of an alimentary paste strip according to the invention.

FIGS. 3 and 4 each illustrate a horizontal view of an alimentary paste plate of lasagna type according to the invention.

DETAILED DESCRIPTION OF THE INVENTION

Figure 5:
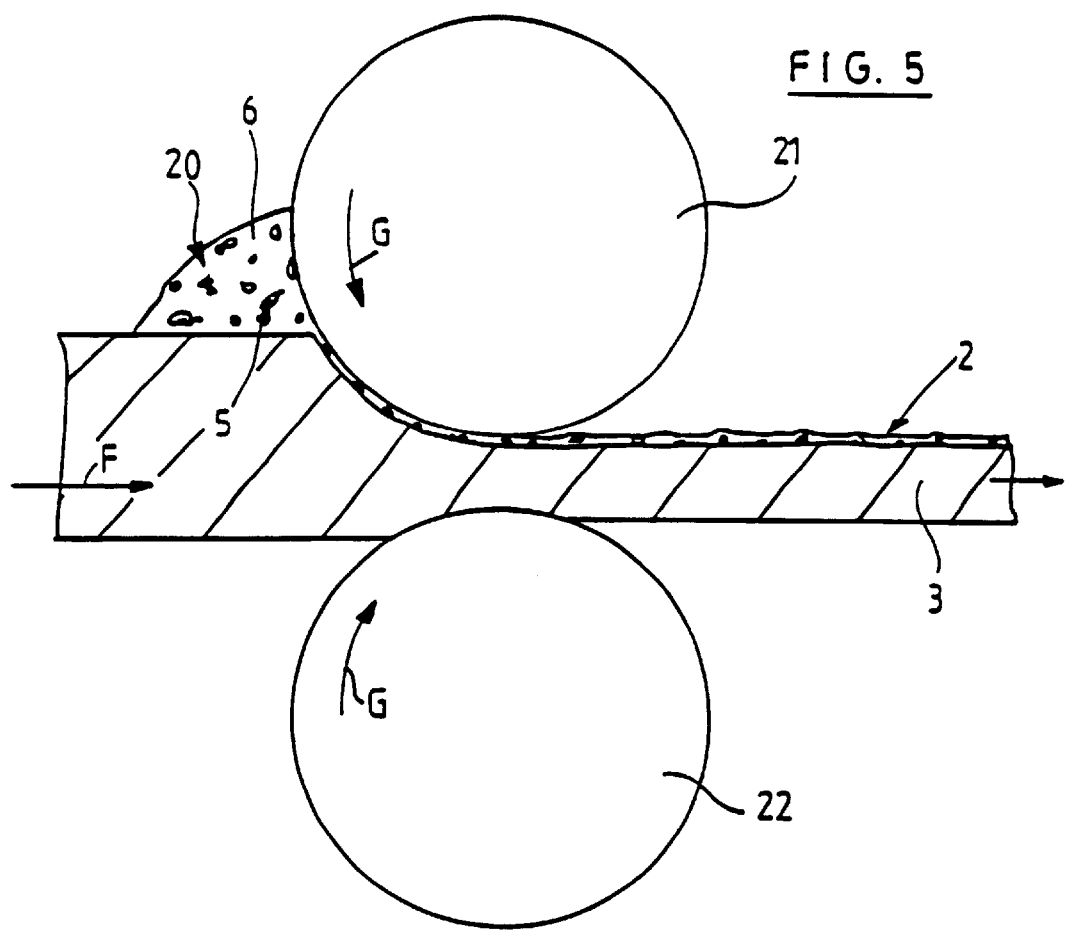
FIG. 5 illustrates the process for preparing alimentary pastes according to the invention.

The pasta strip 1 illustrated on FIG. 1 has a multilayer structure comprising a base layer 3 of classical type with a usual composition such as a mixture of durum wheat semolina and water, and, at least on one of the faces 8, 9 an additional layer 2, 4 having a particular composition, which is superimposed on the base layer 3. Each additional layer 2, 4 is thus formed of a mixture of dough 6 and added ingredients 5 forming together a paste like ball. The added ingredients 5, such as spices or seasonings, are in the form of heteroelements, such as grains of pepper, ground or even entire, minced piments, sage, fine herbs (so called herbes de Provence"), and the like forming occlusions in the dough 6. The added ingredients are disposed in the dough 6 from one place to another.

Advantageously, the thickness of each additional layer 2, 4 substantially corresponds to the average thickness of the added ingredients 5, as shown on FIG. 1. This results in that a good hooking 14 on the base layer 3 of each additional layer 2, 4 is obtained, thereby considerably improving the stability of the multilayer structure on one hand and in that virtually all the added ingredients 5 included in the paste like ball are thus made visible at least in regions 15 protruding with respect to the dough 6 itself of each additional layer 2, 4 in a dispersed way on the surface of the strip 1 on the other hand. As clearly shown on FIG. 1, the added ingredients are partly or completely enclosed in their respective additional layers 2, 4 so as to be very visible, while being sufficiently hooked at it for resisting to a loosening when boiling the pasta. As shown on the Figure, some pieces are located under a superficial transparent thin dough film 13. Advantageously, the transparency effect is obtained by the extreme thinness of the film 13.

Advantageously, the pasty component 6 of each additional layer 2, 4 is formed by the same materials as the base layer so as to provide a better resistance of the dough strip when boiled. Still preferably, the pasty components of each additional layer 2, 4 and the base layer 3 are substantially identical. For example, the initial water content is about 25% to 30% by weight of water. It is understood that eggs can also be added to this mixture so as to obtain pasta with eggs, as it is well known.

FIG. 2 illustrates an alternative embodiment of the dough strip wherein between the base layer 3 and at least one of the additional layers 2, 4, there is provided at least one interposed layer 10, 11 of dough, the basical composition of which is advantageously similar with that of the other layers 2, 3, 4. By giving a particular aroma to each intermediate layer 10, 11, a very fine final bouquet can be obtained.

FIGS. 3 and 4 show still another alternative embodiment wherein at least one of the additional layers 2, 4 contains at least one entire added piece 7. FIG. 3 thereby shows a dough plate 12 of lasagna type having a vegetable branch 7, such as spinach or basil, whereas FIG. 4 shows a similar plate 12 having two branches of aromatic herbs, such as mint or sage disposed in a laurel crown. The visual effect thus obtained is particularly nice.

Besides, at least one of said layers 2, 3, 4, 10, 11, in particular the visible external layers, can also contain ingredients in the form of fine particles, for example based on tomatoes, spinach, cuttle ink etc., so as to provide a certain colour to the layer containing the latter. The operations which the initial dough is subjected to, particularly the kneading result in distributing the ingredients in the form of fine particles in the whole mass of the dough, so that said ingredients act as a colouring agent on the dough aspect. The cuttle ink incorporated on the initial dough thereby provides a uniform black like colour to the latter.

The alimentary pastes according to the present invention are obtained by a process wherein a mixing of the material composing the dough of the or each additional layer and of the added ingredient(s) is carried out resulting in a virtually uniform distribution of said added ingredients, the or each layer is applied on the base layer and the multilayer structure thus obtained is subjected to a lamination, so as to provide an adherence between said layers resisting to boiling. Owing to the composition of layers 2, 4, an excellent hooking of the additional layers 2, 4 on the base layer is obtained, the multilayer structure thus having a good stability as mentioned above. Besides, the adherence between the layers is better and the implementation of the lamination is easier when the basic composition of the dough of the layers is substantially the same.

In order to assure a sufficient cohesion for each additional layer 2, 4 with a heterogeneous composition, adding moisture (steam or water) to said mixture depending on the relative quantity of added ingredients is advantageous, so as to provide a sufficiently supple binding compound for the additional layer. Said addition of steam or water further enhances the spreading out of the heterogeneous layer.

When using the entire added piece 7, said mixture is carried out by a smooth agitation in order to preserve the integrity of said entire added piece. Thereto, a suitable rating of moisture appears to be useful.

In order to produce alimentary pastes having a desired final thickness, the layers are laminated many times successively and stepwise. The progressive lamination allows a smooth production which avoids ruptures of the multilayer structure when laminating. Each successive lamination results in fixing a little more the pieces and/or fragments of added ingredients 5 so that finally the latter 5 are solidly hooked. Consequently, even a long boiling of the pasta may not provoke a loosening of the occlusions 5 out of their enclosing film 2, 4 in the multilayer structure 1 of the alimentary pastes.

The total thickness of the multilayer structure 1 varies for example between 0.5 and 1 mm, preferably between 0.7 and 0.8 mm. Each additional layer 2,4 forming a film has a proper thickness (i.e. without occlusions 5) which is lower than for example 1/10 (a tenth part) of said total thickness, preferably considerably lower than 1/10.

FIG. 5 shows a pair of pasta laminating cylinders 21, 22 allowing the realization of said process.

A mixture is made thereby on a sheet of laminated or extruded fresh dough 3 called hereafter paste like ball 20, containing partly the ingredients as pieces 5 or as a leaf and/or as a branch 7 more or less hard, and partly a soft mixture 6 with a composition identical to the sheet dough 3 or a soft mixture 6 with a different composition and which can be quite different.

The moisture of the paste like ball 20 is substantially higher than that of the dough sheet 3.

A mass of that paste like ball 20 is put on a dough sheet 3 just upstream of a cylinder pair 21, 22 whose separation is set so as to make thinner the sheet. As the moisture of paste like ball 20 is higher than that of the dough sheet 3, the latter is "aspirated" or drawn by the cylinders 21, 22 simultaneously with the sheet, but preferably reversely proportionally with respect to the moisture gradient between the sheet 3 and the paste like ball 20, thereby allowing to set the thickness of the film 2 and the more or less generous distribution of the pieces 5.

For consolidating the hooking and assuring a better distribution of the pieces 5, the sheet 3 with its film of paste like ball 2 can still be made thinner by one or more additional cylinder pairs disposed downstream.

In the process according to the invention, the base layer 3, which is free from added ingredients 5, 7 and consequently substantially homogeneous, is introduced between the cylinder pair 21, 22 following the direction designed by the arrow while setting a paste like ball 20 on the base layer 3 upstream the cylinders 21, 22, which paste like ball 20 has a heterogeneous composition formed by a mixture of paste like ball 6, identical or not with that of the base layer 3 and the added ingredients or hetero-ingredients 5, 7.

Figure 6:
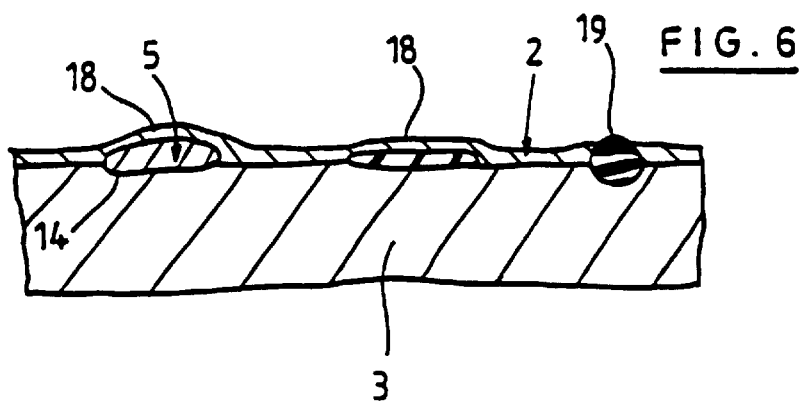
FIG. 6 represents an enlarged view of an alimentary paste portion obtained according to the process illustrated on FIG. 5.

The structure obtained after lamination by the cylinders 21, 22 is shown on FIG. 6. The conventional homogeneous base layer 3 with added ingredients 5, 7, on its surfaces can be distinguished as occlusions which are virtually completely enclosed by the thin additional layer 2, 4 forming a retaining film for the ingredients 5, 7.

The setting up of the added ingredients on the surface of the base layer 3 is thus assured, even after a long boiling of the alimentary pastes. In addition, the thinness of the film layer 2, 4 is such that it results in a visual effect produced by added ingredients, e.g. by the transparency effect generated by the thinness of the film layer 2, 4, especially in the partly 19 or totally 18 recovering regions of said ingredients 5, 7 facing outwardly. Consequently, both the visualisation by the consumer of the added ingredients and the adherence of the latter in the alimentary pastes 1 are perfectly assured.

What is claimed is:

1. An alimentary paste comprising:
    (a) a base layer (3) formed from dough comprising water and at least one of durum wheat semolina and cereal flour, wherein said base layer (3) is substantially homogeneous and free of any added ingredient (5 or 7); and
    (b) at least one additional heterogeneous layer (2 or 4) formed from a mixture of a pasty component (6) and at least one added ingredient (5 or 7), said ingredient (5 or 7) having the form of a fragment, an entire piece or a fine particle, wherein said heterogeneous layer (2 or 4) is superimposed on said base layer (3) and has a thickness which allows said heterogeneous layer (2 or 4) to form a film for setting said added ingredient (5 or 7) with respect to said base layer (3).

2. The alimentary paste according to claim 1, wherein said pasty component (6) of said additional heterogeneous layer (2 or 4) and the dough of said base layer (3) comprise the same materials.

3. The alimentary paste according to claim 2, wherein said pasty component (6) of said additional heterogeneous layer (2 or 4) and the dough of said base layer (3) comprise the same ratio of materials.

4. The alimentary paste according to claim 1, wherein said additional heterogeneous layer (2 or 4) comprises 40 to 90% by weight of said pasty component (6) and respectively from 60 to 10% by weight of said added ingredient (5 or 7).

5. The alimentary paste according to claim 4, wherein said additional heterogeneous layer (2 or 4) comprises approximately 60% by weight of said pasty component (6) and approximately 40% by weight of said added ingredient (5 or 7).

6. The alimentary paste according to claim 1, wherein each additional heterogeneous layer (2 or 4) has a thickness substantially equal to the average thickness of said added ingredient (5 or 7).

7. The alimentary paste according to claim 1, wherein at least one additional heterogeneous layer (2 or 4) comprises said added ingredient in the form of pieces or fragments (5) which are allocated substantially uniformly in each said additional heterogeneous layer.

8. The alimentary paste according to claim 1 or 7, wherein at least one additional heterogeneous layer (2 or 4) comprises at least one added ingredient in the form of an entire piece (7).

9. The alimentary paste according to claim 8, comprising an additional heterogeneous layer (2 or 4) on each surface (8 or 9) of said base layer (3), wherein one additional heterogeneous layer (2) or (4) comprises at least one added ingredient in the form of an entire piece (7) and the other additional heterogeneous layer (4 or 2) contains an added ingredient in the form of fragments (5), wherein said fragments are allocated substantially uniformly in each said additional heterogeneous layer (2 or 4).

10. The alimentary paste according to claim 1, wherein one or both of said base layer (3) and at least one additional heterogeneous layer (2 or 4) each comprises an added ingredient in the form of fine particles so as to provide a colour to each layer (2, 3 or 4) comprising the fine particles.

11. The alimentary paste according to claim 1, further comprising at least one intermediate layer (10 or 11), between said base layer (3) and each additional heterogeneous layer (2 or 4).

12. The alimentary paste according to claim 1, wherein each additional heterogeneous layer (2 or 4) forms a film layer on one of the respective surfaces of said base layer (3) so as to set at least the largest part of said added ingredient (5 or 7) on said base layer and to enclose substantially completely said base layer (3).

13. The alimentary paste according to claim 1, wherein said pasty component (6) is dough.

14. The alimentary paste according to claim 1, wherein said added ingredient (5 or 7) is condiment, spice or vegetable.

15. A process for producing an alimentary paste comprising the steps of:
  (a) forming a base layer (3) from dough comprising water and at least one of durum wheat semolina and cereal flour, wherein said base layer (3) is substantially homogeneous and free of any added ingredient (5 or 7);
  (b) forming a mixture of a pasty component (6) and at least one added ingredient (5 or 7), so as to obtain a substantially uniform distribution of said added ingredient within said mixture, said added ingredient (5 or 7) having the form of a fragment, an entire piece or a fine particle;
  (c) forming at least one additional heterogeneous layer (2 or 4) from said mixture of said pasty component (6) and said at least one added ingredient (5 or 7), said heterogeneous layer (2 or 4) having a thickness which allows said layer (2 or 4) to form a film for setting said added ingredient (5 or 7) with respect to said base layer (3);
  (d) superimposing said heterogeneous layer (2 or 4) onto said base layer (3) to form a multilayer structure; and
  (e) laminating said multilayer structure to adhere said heterogeneous layer (2 or 4) to said base layer (3) so that said layers are resistant to boiling.

16. The process according to claim 15, wherein said mixture forming said at least one additional heterogeneous layer (2 or 4) comprises a paste like ball (20) and said pasty component (6) has a composition which is the same as that of said base layer (3) and said at least one additional heterogeneous layer (2 or 4) is superimposed onto a laminated or extruded sheet of fresh paste forming said base layer (3).

17. The process according to claim 16, wherein said paste like ball (20) comprises said at least one added ingredient in a form selected from the group consisting of one or more of pieces, leaves or branches (5, 7 or 7').

18. The process according to claim 16 or 17, wherein said at least one additional heterogeneous layer (2 or 4) is applied onto a laminated or extruded sheet of fresh paste forming said base layer (3) using a pair of pasta laminating cylinders (21, 22), and a mass of said paste like ball (20) is applied onto said base layer (3) just upstream of said pair of cylinders (21, 22), the spacing of which is set so as to make thinner the outgoing multilayer structure (F).

19. The process according to any one of claims 16, 17, 18, or 15, wherein moisture in the form of steam or water is added to said mixture forming each said additional heterogeneous layer (2 or 4) so as to provide a supple binding compound for the respective additional heterogeneous layer (2 or 4), the amount of said moisture being dependent upon the relative quantity of added ingredient (5 or 7) in said mixture.

20. The process according to claim 19, wherein a substantially higher moisture rate is added to each additional heterogeneous layer (2 or 4), with respect to said base layer (3), when superimposing the layers (2, 3, 4).

21. The process according to claim 20, wherein said paste like ball (20) is drawn (G) by said pasta laminating cylinders (21, 22) simultaneously with said base layer (3), at a rate reversely proportional to the moisture gradient between said base layer (3) and said paste like ball (20).

22. The process according to claim 21, wherein said paste like ball (20) is drawn (G) by said pasta laminating cylinders (21, 22) at a rate reversely proportional with respect to said moisture gradient.

23. The process according to claim 15, wherein said added ingredient is in the form of an entire piece (7) and said mixture forming each said additional heterogeneous layer (2 or 4) is formed by smooth shaking so as to preserve the integrity of said entire piece (7).

24. The process according to claim 15, wherein said layers (2, 3, 4) are successively laminated several times so as to obtain stepwise and progressively a multilayer structure of alimentary pastes having a desired final thickness and to consolidate the hooking of said added ingredient (5 or 7).

* * * * *